(12) United States Patent
Huang et al.

(10) Patent No.: US 12,449,637 B2
(45) Date of Patent: Oct. 21, 2025

(54) OPTICAL LENS ASSEMBLY

(71) Applicant: NEWMAX TECHNOLOGY CO., LTD., Taichung (TW)

(72) Inventors: Ching-Yun Huang, Taichung (TW); Sian-Chih Ke, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 568 days.

(21) Appl. No.: 17/965,891

(22) Filed: Oct. 14, 2022

(65) Prior Publication Data

US 2024/0036292 A1 Feb. 1, 2024

(30) Foreign Application Priority Data

Jul. 26, 2022 (TW) .................................. 111127867

(51) Int. Cl.
*G02B 13/00* (2006.01)
*G02B 9/12* (2006.01)

(52) U.S. Cl.
CPC ........... *G02B 13/0035* (2013.01); *G02B 9/12* (2013.01)

(58) Field of Classification Search
None
See application file for complete search history.

(56) References Cited

U.S. PATENT DOCUMENTS

2022/0326487 A1* 10/2022 Gong ........................ G02B 9/12

\* cited by examiner

*Primary Examiner* — Richard H Kim
(74) *Attorney, Agent, or Firm* — Juan Carlos A. Marquez; Marquez IP Law Office, PLLC

(57) ABSTRACT

An optical lens assembly includes, in order from an object side to an image side: a first lens; a stop; a second lens; a third lens; and an infrared bandpass filter, wherein a maximum field of view of the optical lens assembly is FOV, an f-number of the optical lens assembly is Fno, a radius of curvature of an object-side surface of the third lens is R5, a distance from an object-side surface of the first lens to an image plane along an optical axis is TL, an entrance pupil diameter of the optical lens assembly is EPD, a distance from the image-side surface of the first lens to the object-side surface of the second lens along the optical axis is T12, and the following conditions are satisfied: $19.82<FOV*Fno/(R5*TL)<50.37$, and $6.58<EPD*TL/T12<24.94$.

15 Claims, 12 Drawing Sheets

OPTICAL LENS ASSEMBLY

CROSS-REFERENCE TO RELATED APPLICATION

This application claims the benefit of Taiwan Patent Application No. 111127867, filed on Jul. 26, 2022, which is hereby incorporated by reference for all purposes as if fully set forth herein.

BACKGROUND

Technical Field

The present disclosure relates to an optical lens assembly, and in particular, to an optical lens assembly applicable to an electronic device.

Related Art

The 3D sensing technology develops rapidly in various fields such as mobile phones, aerial cameras, and sweeping robots. For the portability, miniaturized optical lens modules have become indispensable. The advancement of semiconductor process technologies enables the development of image sensors with a smaller size and more pixels. Therefore, a research of a miniaturized optical lens module with a large optical aperture and a wide viewing angle is important.

A conventional Time of Flight (TOF) optical lens module with an ultra-large optical aperture generally includes an infrared sensing optical lens assembly with more than four lenses, but can hardly be mounted in portable electronic devices, such as mobile phones and tablet computers, due to its relatively large volume. In addition, its high production costs are also a problem to be resolved.

SUMMARY

An objective of the present disclosure is to resolve the foregoing problems of a large volume and high costs of an infrared sensing optical lens assembly with an ultra-large optical aperture in the related art. To achieve the foregoing objective, the present disclosure provides an optical lens assembly, in order from an object side to an image side, comprising: a first lens with a refractive power; a stop; a second lens with a positive refractive power, comprising an object-side surface and an image-side surface, the object-side surface of the second lens being convex near an optical axis, and the image-side surface of the second lens being convex near the optical axis; a third lens with a positive refractive power, comprising an object-side surface and an image-side surface, the object-side surface of the third lens being convex near the optical axis; and an infrared bandpass filter.

A maximum field of view of the optical lens assembly is FOV, an f-number of the optical lens assembly is Fno, a radius of curvature of the object-side surface of the third lens is R5, a distance from an object-side surface of the first lens to an image plane along the optical axis is TL, an entrance pupil diameter of the optical lens assembly is EPD, a distance from the image-side surface of the first lens to the object-side surface of the second lens along the optical axis is T12, and the following conditions are satisfied: $19.82<FOV*Fno/(R5*TL)<50.37$, and $6.58<EPD*TL/T12<24.94$.

When the foregoing optical lens assembly satisfies $19.82<FOV*Fno/(R5*TL)<50.37$, and $6.58<EPD*TL/T12<24.94$, with the proper configuration, the effect of taking both an ultra-large optical aperture of a wide viewing angle feature and miniaturization into account can be achieved.

A total quantity of lenses with refractive power in the optical lens assembly is three.

A focal length of the optical lens assembly is f, a focal length of the second lens is f2, and the following condition is satisfied: $0.33<f/f2<0.86$. With the proper configuration of the focal length of the second lens and the focal length of the optical lens assembly, an aberration caused by a large optical aperture can be corrected, thereby alleviating optical distortion to improve the image quality.

A focal length of the first lens is f1, a focal length of the third lens is f3, and the following condition is satisfied: $-3.93<f1/f3<1.44$. In this way, a proportional distribution of the focal length of the second lens and the focal length of the third lens is more appropriate, being conducive to providing greater illumination of the optical lens assembly.

A focal length of the second lens is f2, a central thickness of the second lens along the optical axis is CT2, and the following condition is satisfied: $0.87<f2/CT2<3.66$. In this way, the refractive power of the second lens and the formability of the thickness of the lens are optimally balanced to facilitate the manufacturing.

A focal length of the third lens is f3, a central thickness of the third lens along the optical axis is CT3, and the following condition is satisfied: $1.86<f3/CT3<68.30$. In this way, a best ratio of the refractive power of the third lens to the thickness of the third lens can be achieved to satisfy the required refractive power and maintain good manufacturability.

A radius of curvature of the object-side surface of the first lens is R1, a radius of curvature of an image-side surface of the first lens is R2, and the following condition is satisfied: $0.72<R1/R2<3.39$. With the preferable lens curvature configuration, a large optical aperture feature can be satisfied.

The radius of curvature of the object-side surface of the third lens is R5, a radius of curvature of an image-side surface of the third lens is R6, and the following condition is satisfied: $-0.08<R5/R6<1.25$. With the proper lens curvature configuration, an aberration can be corrected, and the image quality can be improved.

A central thickness of the third lens along the optical axis is CT3, the radius of curvature of the object-side surface of the third lens is R5, and the following condition is satisfied: $0.24<CT3/R5<0.89$. In this way, a best ratio of the refractive power of the third lens to the thickness of the third lens can be achieved to reduce an aberration.

A radius of curvature of the object-side surface of the second lens is R3, a radius of curvature of the image-side surface of the second lens is R4, a focal length of the second lens is f2, and the following condition is satisfied: $-69.59<R3/(R4*fg2)<-0.01$. In this way, a best ratio of the refractive power of the second lens to the thickness of the second lens can be achieved to improve the image quality of the optical lens assembly.

A central thickness of the first lens along the optical axis is CT1, a central thickness of the second lens along the optical axis is CT2, a central thickness of the third lens along the optical axis is CT3, and the following condition is satisfied: $2.37<(CT1+CT2)/CT3<7.61$. By properly adjusting the thickness distribution of the lenses, both miniaturization and the performance of the optical lens assembly can be taken into account.

The distance from the image-side surface of the first lens to the object-side surface of the second lens along the optical axis is T12, a distance from the image-side surface of the second lens to the object-side surface of the third lens along the optical axis is T23, and the following condition is satisfied: $0.92<T12/T23<7.52$. In this way, an assembly tolerance of the optical lens assembly can be optimized.

A central thickness of the second lens along the optical axis is CT2, the entrance pupil diameter of the optical lens assembly is EPD, a distance from an image-side surface of the third lens to the image plane along the optical axis is BFL, and the following condition is satisfied: $0.85<CT2*EPD/BFL<2.93$. Proper configurations of a large-optical-aperture lens and the optical back focal length can be provided, to satisfy the effect of miniaturization.

A distance from an image-side surface of the third lens to the image plane along the optical axis is BFL, the distance from the object-side surface of the first lens to the image plane along the optical axis is TL, and the following condition is satisfied: $0.19<BFL/TL<0.34$. In this way, the back focus and the height of the lens assembly are the best, thereby satisfying the requirements of miniaturization and the back focus space of the optical lens module.

The distance from the object-side surface of the first lens to the image plane along the optical axis is TL, a maximum image height of the optical lens assembly is IMH, and the following condition is satisfied: $2.36<TL/IMH<3.76$, helping to achieve a proper balance between miniaturization and an imaging region.

A half of the maximum field of view of the optical lens assembly is HFOV, the f-number of the optical lens assembly is Fno, a refractive index of the first lens is nd1, a refractive index of the second lens is nd2, a refractive index of the third lens is nd3, and the following condition is satisfied: $7.40<HFOV*Fno/(nd1+nd2+nd3)<13.05$. In this way, by properly adjusting refractive indexes of the lenses, both the large optical aperture and a proper field of view can be taken into account.

The optical lens assembly provided in the present disclosure can provide a three-piece infrared sensing lens with an ultra-large optical aperture and a wide viewing angle applicable to the 3D sensing technology. In addition, the optical lens assembly provided in the present disclosure has lower production costs and a smaller module, and can provide sufficient relative illumination under the conditions of an ultra-large optical aperture and a wide viewing angle.

DETAILED DESCRIPTION

To enable a person of ordinary skill in the art to understand the content of the present disclosure and accordingly implement the content of the present disclosure, appropriate embodiments are described below with reference to the drawings, and all equivalent replacements and modifications based on the content of the present disclosure are intended to be included within the scope of the claims of the present disclosure. In addition, it is stated that the drawings attached to the present disclosure are not depicted in actual sizes. Although the present disclosure provides examples of specific parameters, it should be understood that parameters do not need to be completely equal to corresponding values. Within an acceptable error range, the values approximate their corresponding parameters. The embodiments below will further describe in detail the technical content of the present disclosure, but the disclosed content is not intended to limit the scope of the claims of the present disclosure.

First Embodiment

Figure 1A:
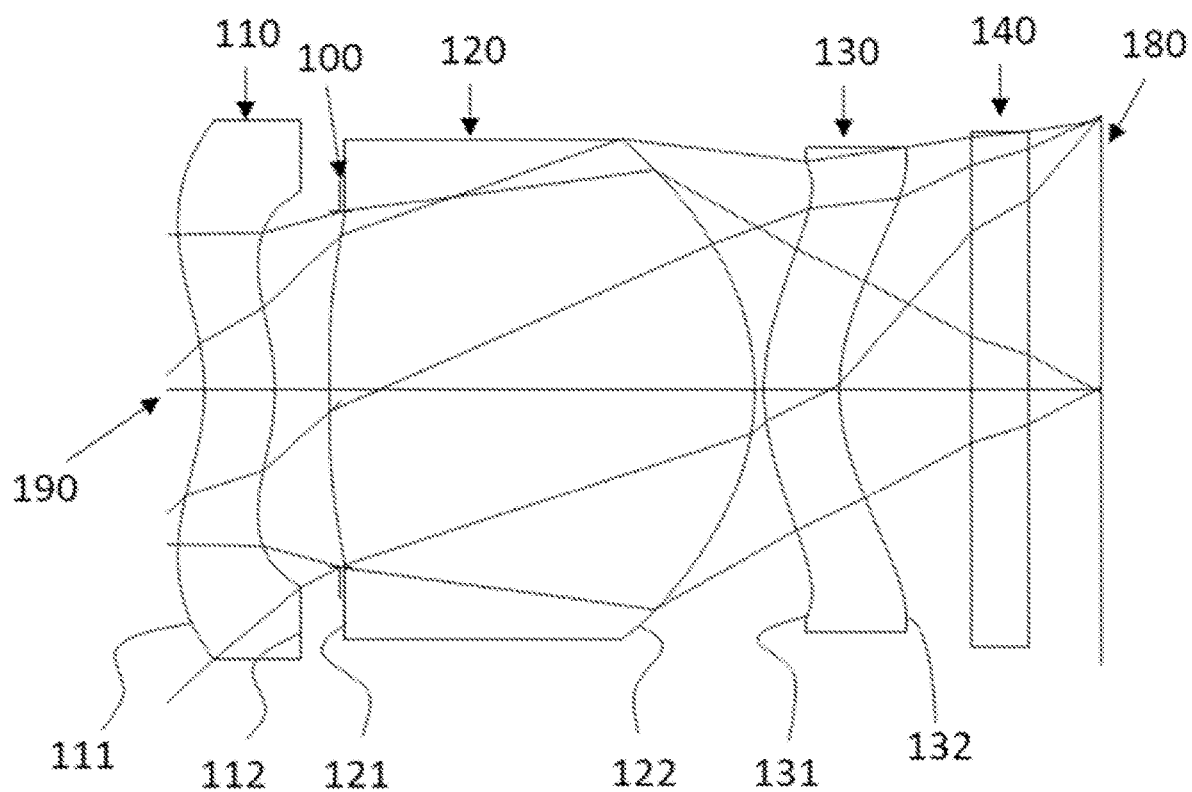
FIG. 1A is a schematic view of an optical lens assembly according to a first embodiment of the present disclosure.
Figure 1B:
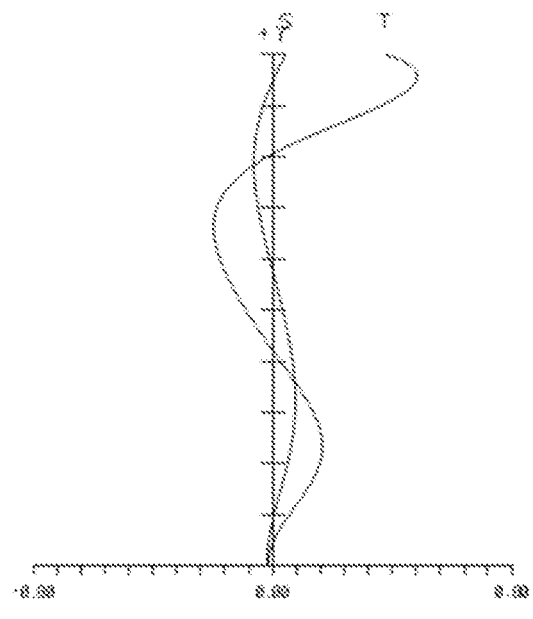
FIG. 1B sequentially shows a field curvature curve and a distortion curve of the optical lens assembly according to the first embodiment.
Figure 1B:
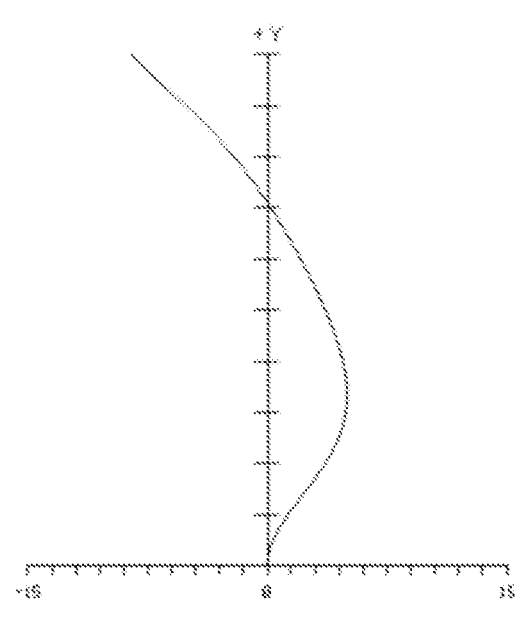

Referring to FIG. 1A and FIG. 1B, FIG. 1A is a schematic view of an optical lens assembly according to a first embodiment of the present disclosure, and FIG. 1B sequentially shows a field curvature curve and a distortion curve of the optical lens assembly according to the first embodiment. As can be seen from FIG. 1A, the optical lens assembly includes, in order from an object side to an image side: a first lens 110, a stop 100, a second lens 120, a third lens 130, an infrared bandpass filter 140, and an image plane 180. A total quantity of lenses with refractive power in the optical lens assembly is three, but this application is not limited thereto.

The first lens 110 with a positive refractive power includes an object-side surface 111 and an image-side surface 112, wherein the object-side surface 111 of the first lens 110 is concave near an optical axis 190, the image-side surface 112 of the first lens 110 is convex near the optical axis 190, and both the object-side surface 111 and the image-side surface 112 are aspheric.

The second lens 120 with a positive refractive power includes an object-side surface 121 and an image-side surface 122, wherein the object-side surface 121 of the second lens 120 is convex near the optical axis 190, the image-side surface 122 of the second lens 120 is convex near the optical axis 190, and both the object-side surface 121 and the image-side surface 122 are aspheric.

The third lens 130 with a positive refractive power includes an object-side surface 131 and an image-side surface 132, wherein the object-side surface 131 of the third lens 130 is convex near the optical axis 190, the image-side surface 132 of the third lens 130 is concave near the optical axis 190, and both the object-side surface 131 and the image-side surface 132 are aspheric.

The infrared bandpass filter (IR bandpass filter) 140 is made of glass and is disposed between the third lens 130 and the image plane 180 without affecting a focal length of the optical lens assembly. In this embodiment, an optical filter having a wavelength band of passable light in a range of 940 nm±30 nm is selected. It can be understood that the IR bandpass filter 140 may also be formed on the surface of the above-mentioned lens, and the IR bandpass filter 140 may also be made of other material.

Aspheric curve equations of the above-mentioned lenses are expressed as follows:

$$z(h) = \frac{ch^2}{1 + [1-(k+1)c^2h^2]^{0.5}} + \sum (A_i) \cdot (h^i)$$

wherein, z is a position value in the direction of the optical axis 190 and with a surface vertex as a reference at a position of a height h; c is a curvature of a lens surface near the optical axis 190, and is a reciprocal of a radius of curvature (R) (c=1/R), R is a radius of curvature of a lens surface near the optical axis 190, h is a vertical distance between the lens surface and the optical axis 190, k is a conic constant, and Ai is an $i^{th}$ order aspheric coefficient.

In the first embodiment, a focal length of the optical lens assembly is f, an f-number of the optical lens assembly is Fno, and a maximum field of view (field of view 2ω) in the optical lens assembly is FOV, and values are as follows: f=1.18 (mm); Fno=0.98; and FOV=88.6 (degrees).

In the optical lens assembly of the first embodiment, a focal length of the first lens 110 is f1, a focal length of the second lens 120 is f2, and a focal length of the third lens 130 is f3, and values are as follows: f1=17.32 (mm); f2=1.68 (mm); and f3=13.85 (mm).

In the optical lens assembly of the first embodiment, a maximum field of view of the optical lens assembly is FOV, an f-number of the optical lens assembly is Fno, a radius of curvature of the object-side surface 131 of the third lens 130 is R5, a distance from an object-side surface 111 of the first lens 110 to an image plane 180 along the optical axis 190 is TL, an entrance pupil diameter of the optical lens assembly is EPD, a distance from the image-side surface 112 of the first lens 110 to the object-side surface 121 of the second lens 120 along the optical axis 190 is T12, and the following conditions are satisfied: FOV*Fno/(R5*TL)=32.38, and EPD*TL/T12=19.52.

In the optical lens assembly of the first embodiment, a focal length of the optical lens assembly is f, a focal length of the second lens 120 is f2, and the following condition is satisfied: f/f2=0.70.

In the optical lens assembly of the first embodiment, a focal length of the first lens is f1, a focal length of the third lens 130 is f3, and the following condition is satisfied: f1/f3=1.25.

In the optical lens assembly of the first embodiment, a focal length of the second lens 120 is f2, a central thickness of the second lens 120 along the optical axis 190 is CT2, and the following condition is satisfied: f2/CT2=1.06.

In the optical lens assembly of the first embodiment, a focal length of the third lens 130 is f3, a central thickness of the third lens 130 along the optical axis 190 is CT3, and the following condition is satisfied: f3/CT3=49.30.

In the optical lens assembly of the first embodiment, a radius of curvature of the object-side surface 111 of the first lens 110 is R1, a radius of curvature of the image-side surface 112 of the first lens 110 is R2, and the following condition is satisfied: R1/R2=0.98.

In the optical lens assembly of the first embodiment, a radius of curvature of the object-side surface 131 of the third lens 130 is R5, a radius of curvature of the image-side surface 132 of the third lens 130 is R6, and the following condition is satisfied: R5/R6=1.05.

In the optical lens assembly of the first embodiment, a central thickness of the third lens 130 along the optical axis 190 is CT3, a radius of curvature of the object-side surface 131 of the third lens 130 is R5, and the following condition is satisfied: CT3/R5=0.35.

In the optical lens assembly of the first embodiment, a radius of curvature of the object-side surface 121 of the second lens 120 is R3, a radius of curvature of the image-side surface 122 of the second lens 120 is R4, a focal length of the second lens 120 is f2, and the following condition is satisfied: R3/(R4*f2)=−60.51.

In the optical lens assembly of the first embodiment, a central thickness of the first lens 110 along the optical axis 190 is CT1, a central thickness of the second lens 120 along the optical axis 190 is CT2, a central thickness of the third lens 130 along the optical axis 190 is CT3, and the following condition is satisfied: (CT1+CT2)/CT3=6.61.

In the optical lens assembly of the first embodiment, a distance from the image-side surface 112 of the first lens 110 to the object-side surface 121 of the second lens 120 along the optical axis is T12, a distance from the image-side surface 122 of the second lens 120 to the object-side surface 131 of the third lens 130 along the optical axis is T23, and the following condition is satisfied: T12/T23=5.74.

In the optical lens assembly of the first embodiment, a central thickness of the second lens 120 along the optical axis 190 is CT2, an entrance pupil diameter of the optical lens assembly is EPD, a distance from the image-side surface 132 of the third lens 130 to the image plane 180 along the optical axis 190 is BFL, and the following condition is satisfied: CT2*EPD/BFL=1.94.

In the optical lens assembly of the first embodiment, a distance from the image-side surface 132 of the third lens 130 to the image plane 180 along the optical axis 190 is BFL, a distance from the object-side surface 111 of the first lens 110 to the image plane 180 along the optical axis 190 is TL, and the following condition is satisfied: BFL/TL=0.29.

In the optical lens assembly of the first embodiment, a distance from the object-side surface 111 of the first lens 110 to the image plane 180 along the optical axis 190 is TL, a maximum image height of the optical lens assembly is IMH, and the following condition is satisfied: TL/IMH=3.18.

In the optical lens assembly of the first embodiment, a half of the maximum field of view of the optical lens assembly is HFOV, an f-number of the optical lens assembly is Fno, a refractive index of the first lens 110 is nd1, a refractive index of the second lens 120 is nd2, a refractive index of the third lens 130 is nd3, and the following condition is satisfied: HFOV*Fno/(nd1+nd2+nd3)=8.77.

Refer to Table 1 and Table 2 below.

TABLE 1

First embodiment
f (focal length) = 1.18 mm, Fno (f-number) = 0.98, FOV (field of view 2ω) = 88.6 deg. (degrees)

| Surface # | | Radius of curvature (mm) | Central thickness/ Gap (mm) | Material | Refractive index (nd) | Abbe number (vd) | Focal length (mm) |
|---|---|---|---|---|---|---|---|
| 0 | Object | Infinity | 800 | | | | |
| 1 | First lens | −0.919 (ASP) | 0.266 | | 1.64 | 22.47 | 17.32 |
| 2 | | −0.940 (ASP) | 0.249 | Plastic | | | |
| 3 | Stop | Infinity | −0.041 | | | | |
| 4 | Second lens | 110.467 (ASP) | 1.593 | Plastic | 1.67 | 19.24 | 1.68 |
| 5 | | −1.086 (ASP) | 0.036 | | | | |
| 6 | Third lens | 0.797 (ASP) | 0.281 | Plastic | 1.64 | 22.47 | 13.85 |
| 7 | | 0.760 (ASP) | 0.500 | | | | |
| 8 | IR bandpass filter | Infinity | 0.210 | Glass | 1.52 | 64.20 | |
| 9 | | Infinity | 0.274 | | | | |
| 10 | Image plane | Infinity | — | | | | |

Reference wavelength 940 nm

TABLE 2

Aspheric coefficient

| Surface | 1 | 2 | 4 | 5 | 6 | 7 |
|---|---|---|---|---|---|---|
| K: | −5.3583E+00 | −5.5297E+00 | −9.4669E+01 | −4.4616E−01 | −1.4200E+01 | −4.8139E−01 |
| A2: | 0.0000E+00 | 0.0000E+00 | 0.0000E+00 | 0.0000E+00 | 0.0000E+00 | 0.0000E+00 |
| A4: | 1.6572E−01 | −1.1426E+00 | 3.2973E−01 | −9.6343E−02 | 8.0617E−01 | −1.0945E+00 |
| A6: | 1.6788E+00 | 3.0595E+01 | 9.9454E+00 | −9.6839E−01 | −3.8704E+00 | 3.6570E+00 |
| A8: | −4.6322E+00 | −2.3802E+02 | 8.3377E+02 | 9.1764E+00 | 9.9366E+00 | −1.8199E+01 |
| A10: | 5.5635E+00 | 1.0543E+03 | 8.3377E+02 | −3.1927E+01 | −6.8914E+00 | 6.7093E+01 |
| A12: | −2.7255E+00 | −2.7436E+03 | −3.1571E+03 | 6.1373E+01 | −3.7502E+01 | −1.6717E+02 |
| A14: | −1.1121E−01 | 4.1050E+03 | 7.3893E+03 | −7.0931E+01 | 1.1887E+02 | 2.6352E+02 |
| A16: | 2.0168E−01 | −3.2049E+03 | −1.0433E+04 | 4.9056E+01 | −1.5536E+02 | −2.5069E+02 |
| A18: | 3.7272E−01 | 9.5071E+02 | 8.0926E+03 | −1.8717E+01 | 9.8794E+01 | 1.3102E+02 |
| A20: | −1.9558E−01 | 5.5201E+01 | −2.6287E+03 | 3.0293E+00 | −2.5001E+01 | −2.8885E+01 |

Table 1 shows detailed configuration data of the first embodiment in FIG. 1A. Units of the radius of curvature, the central thickness, the gap, and the focal length are mm. Surfaces 0 to 10 sequentially represent surfaces from an object side to an image side. The surface 0 is a gap between an object and the stop 100 along the optical axis 190. The surface 3 is a gap between the stop 100 and the object-side surface 121 of the second lens 120 along the optical axis 190. In addition, the object-side surface 121 of the second lens 120 is closer to the object side than the stop 100, and therefore the surface 3 is represented by a negative value. On the contrary, if the stop 100 is closer to the object side than the object-side surface 121 of the second lens 120, the surface 3 is represented by a positive value. The surfaces 1, 4, 6, and 8 are respectively central thicknesses of the first lens 110, the second lens 120, the third lens 130, and the IR bandpass filter 140 along the optical axis 190. The surfaces 2, 5, 7, and 9 are respectively a gap between the first lens 110 and the second lens 120 along the optical axis 190, a gap between the second lens 120 and the third lens 130 along the optical axis 190, a gap between the third lens 130 and the IR bandpass filter 140 along the optical axis 190, and a gap between the IR bandpass filter 140 and the image plane 180 along the optical axis 190.

Table 2 shows aspheric data in the first embodiment, where k represents a conical surface coefficient in the aspheric curve equation, A2, A4, A6, A8, A10, A12, A14, A16, A18, and A20 are higher-order aspheric coefficients. In addition, the following tables of embodiments are schematic views and aberration curves corresponding to the embodiments, and the definitions of data in the tables of the embodiments are the same as the definitions in Table 1 and Table 2 of the first embodiment, and are not repeated herein.

Second Embodiment

Figure 2A:
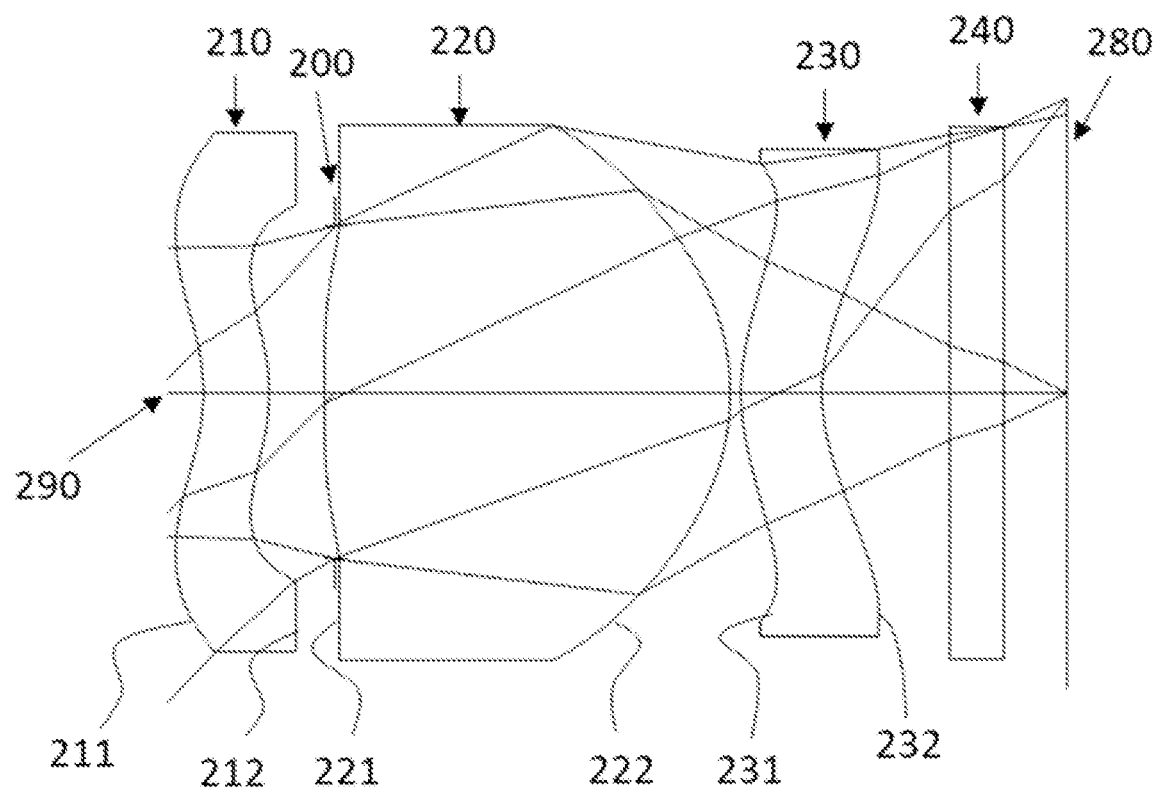
FIG. 2A is a schematic view of an optical lens assembly according to a second embodiment of the present disclosure.
Figure 2B:
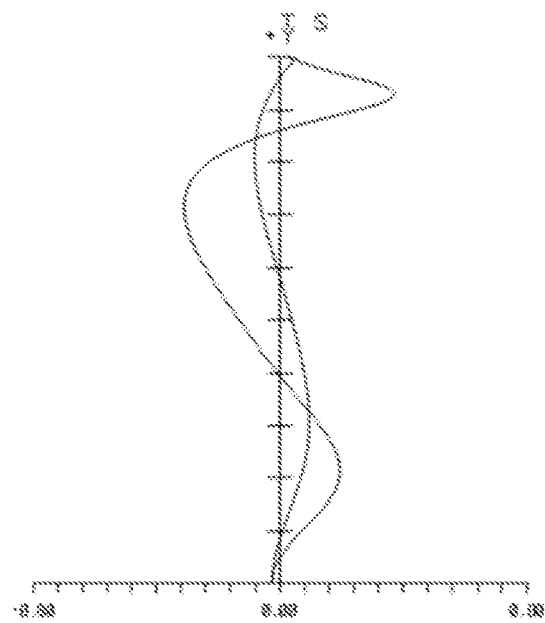
FIG. 2B sequentially shows a field curvature curve and a distortion curve of the optical lens assembly according to the second embodiment.
Figure 2B:
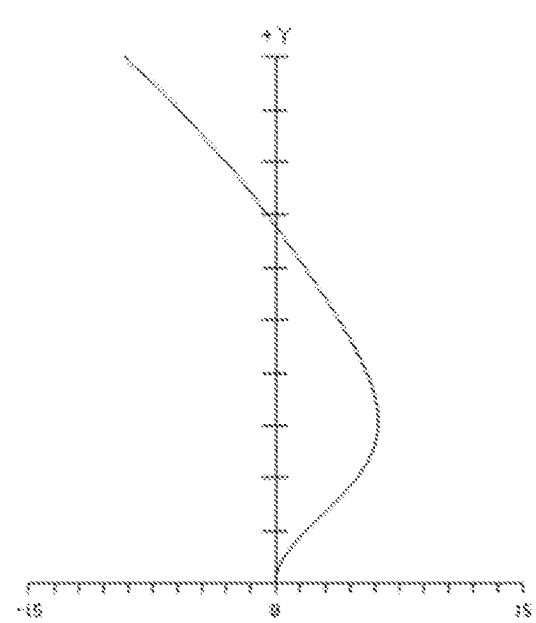

Referring to FIG. 2A and FIG. 2B, FIG. 2A is a schematic view of an optical lens assembly according to a second embodiment of the present disclosure, and FIG. 2B sequentially shows a field curvature curve and a distortion curve of the optical lens assembly according to the second embodiment. As can be seen from FIG. 2A, the optical lens assembly includes, in order from an object side to an image side: a first lens 210, a stop 200, a second lens 220, a third lens 230, an infrared bandpass filter 240 and an image plane 280. A total quantity of lenses with refractive power in the optical lens assembly is three, but this application is not limited thereto.

The first lens 210 with a positive refractive power includes an object-side surface 211 and an image-side surface 212, wherein the object-side surface 211 of the first lens 210 is concave near an optical axis 290, the image-side surface 212 of the first lens 210 is convex near the optical axis 290, and both the object-side surface 211 and the image-side surface 212 are aspheric.

The second lens 220 with a positive refractive power includes an object-side surface 221 and an image-side surface 222, wherein the object-side surface 221 of the second lens 220 is convex near the optical axis 290, the image-side surface 222 of the second lens 220 is convex near the optical axis 290, and both the object-side surface 221 and the image-side surface 222 are aspheric.

The third lens 230 with a positive refractive power includes an object-side surface 231 and an image-side surface 232, wherein the object-side surface 231 of the third lens 230 is convex near the optical axis 290, the image-side surface 232 of the third lens 230 is concave near the optical axis 290, and both the object-side surface 231 and the image-side surface 232 are aspheric.

The infrared bandpass filter (IR bandpass filter) 240 is made of glass and is disposed between the third lens 230 and the image plane 280 without affecting a focal length of the optical lens assembly. In this embodiment, an optical filter having a wavelength band of passable light in a range of 940 nm±30 nm is selected. It can be understood that the IR bandpass filter 240 may also be formed on the surface of the above-mentioned lens, and the IR bandpass filter 240 may also be made of other material.

Refer to Table 3 and Table 4 below.

TABLE 3

Second embodiment
f (focal length) = 1.16 mm, Fno (f-number) = 0.98, FOV (field of view 2ω) = 97.3 deg. (degrees)

| Surface # | | Radius of curvature (mm) | Central thickness/ Gap (mm) | Material | Refractive index (nd) | Abbe number (vd) | Focal length (mm) |
|---|---|---|---|---|---|---|---|
| 0 | Object | Infinity | 800 | | | | |
| 1 | First lens | −0.830 (ASP) | 0.255 | Plastic | 1.64 | 22.47 | 21.62 |
| 2 | | −0.874 (ASP) | 0.256 | | | | |
| 3 | Stop | Infinity | −0.043 | | | | |
| 4 | Second lens | 53.632 (ASP) | 1.582 | Plastic | 1.67 | 19.24 | 1.64 |
| 5 | | −1.061 (ASP) | 0.038 | | | | |
| 6 | Third lens | 0.842 (ASP) | 0.318 | Plastic | 1.64 | 22.47 | 18.65 |
| 7 | | 0.776 (ASP) | 0.500 | | | | |
| 8 | IR bandpass filter | Infinity | 0.210 | Glass | 1.52 | 64.20 | |
| 9 | | Infinity | 0.247 | | | | |
| 10 | Image plane | Infinity | — | | | | |

Reference wavelength 940 nm

TABLE 4

Aspheric coefficient

| Surface | 1 | 2 | 4 | 5 | 6 | 7 |
|---|---|---|---|---|---|---|
| K: | −5.2834E+00 | −4.3240E+00 | −8.2807E+01 | −4.6165E−01 | −1.8047E+01 | −4.7329E−01 |
| A2: | 0.0000E+00 | 0.0000E+00 | 0.0000E+00 | 0.0000E+00 | 0.0000E+00 | 0.0000E+00 |
| A4: | 1.4949E−01 | −1.1071E+00 | 3.2252E−01 | −9.1507E−02 | 6.8615E−01 | −1.2257E+00 |
| A6: | 1.7007E+00 | 3.0681E+01 | 9.9363E+00 | −9.6048E−01 | −3.8496E+00 | 3.7599E+00 |
| A8: | −4.6253E+00 | −2.3818E+02 | 8.3382E+02 | 9.1756E+00 | 1.0063E+01 | −1.8097E+01 |
| A10: | 5.5538E+00 | 1.0539E+03 | 8.3382E+02 | −3.1932E+01 | −6.8238E+00 | 6.7107E+01 |
| A12: | −2.7282E+00 | −2.7438E+03 | −3.1571E+03 | 6.1371E+01 | −3.7534E+01 | −1.6724E+02 |
| A14: | −1.0996E−01 | 4.1061E+03 | 7.3892E+03 | −7.0930E+01 | 1.1876E+02 | 2.6345E+02 |
| A16: | 2.1081E−01 | −3.2020E+03 | −1.0433E+04 | 4.9058E+01 | −1.5549E+02 | −2.5071E+02 |
| A18: | 3.7561E−01 | 9.5363E+02 | 8.0922E+03 | −1.8716E+01 | 9.8766E+01 | 1.3111E+02 |
| A20: | −2.0271E−01 | 4.6308E+01 | −2.6272E+03 | 3.0278E+00 | −2.4724E+01 | −2.8881E+01 |

In the second embodiment, an aspheric curve equation is expressed as that in the first embodiment. In addition, definitions of parameters in the following tables are the same as those in the first embodiment, and are not repeated herein.

Referring to Table 3 and Table 4, the following data can be deduced:

| Second embodiment | | | |
|---|---|---|---|
| f1 | 21.62 | R5/R6 | 1.08 |
| f2 | 1.64 | CT3/R5 | 0.38 |
| f3 | 18.65 | R3/(R4*f2) | −30.89 |
| EPD*TL/T12 | 18.69 | (CT1 + CT2)/CT3 | 5.78 |
| FOV*Fno/(R5*TL) | 33.74 | T12/T23 | 5.67 |
| f/f2 | 0.71 | CT2*EPD/BFL | 1.96 |
| f1/f3 | 1.16 | BFL/TL | 0.28 |
| f2/CT2 | 1.03 | TL/IMH | 2.78 |
| f3/CT3 | 58.69 | HFOV*Fno/(nd1 + nd2 + nd3) | 9.63 |
| R1/R2 | 0.95 | | |

Third Embodiment

Figure 3A:
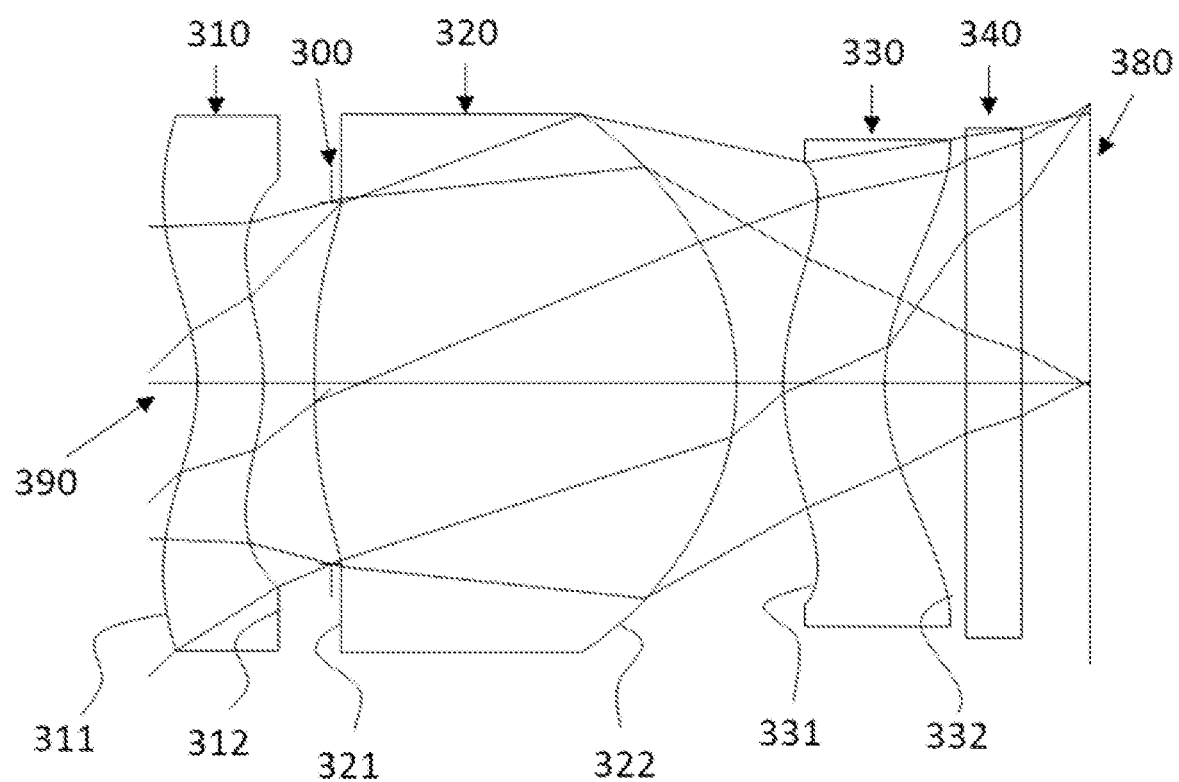
FIG. 3A is a schematic view of an optical lens assembly according to a third embodiment of the present disclosure.
Figure 3B:
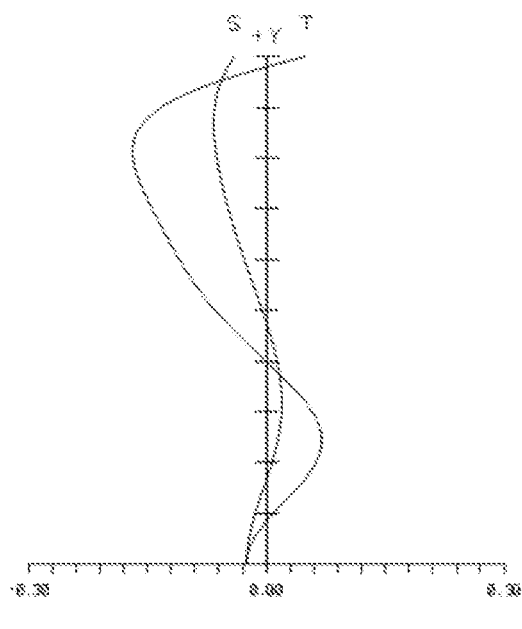
FIG. 3B sequentially shows a field curvature curve and a distortion curve of the optical lens assembly of the third embodiment.
Figure 3B:
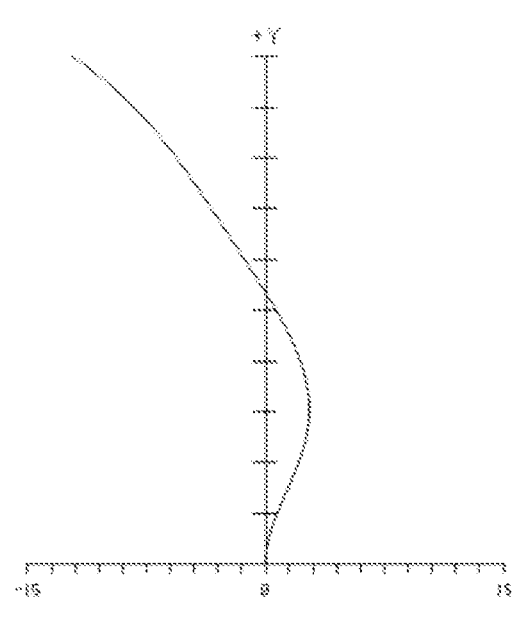

Referring to FIG. 3A and FIG. 3B, FIG. 3A is a schematic view of an optical lens assembly according to a third embodiment of the present disclosure, and FIG. 3B sequentially shows a field curvature curve and a distortion curve of the optical lens assembly according to the third embodiment. As can be seen from FIG. 3A, the optical lens assembly includes, in order from an object side to an image side: a first lens 310, a stop 300, a second lens 320, a third lens 330, an infrared bandpass filter 340 and an image plane 380. A total quantity of lenses with refractive power in the optical lens assembly is three, but this application is not limited thereto.

The first lens 310 with a positive refractive power includes an object-side surface 311 and an image-side surface 312, wherein the object-side surface 311 of the first lens 310 is concave near an optical axis 390, the image-side surface 312 of the first lens 310 is convex near the optical axis 390, and both the object-side surface 311 and the image-side surface 312 are aspheric.

The second lens 320 with a positive refractive power includes an object-side surface 321 and an image-side surface 322, wherein the object-side surface 321 of the second lens 320 is convex near the optical axis 390, the image-side surface 322 of the second lens 320 is convex near the optical axis 390, and both the object-side surface 321 and the image-side surface 322 are aspheric.

The third lens 330 with a positive refractive power includes an object-side surface 331 and an image-side surface 332, wherein the object-side surface 331 of the third lens 330 is convex near the optical axis 390, the image-side surface 332 of the third lens 330 is concave near the optical axis 390, and both the object-side surface 331 and the image-side surface 332 are aspheric.

The infrared bandpass filter (IR bandpass filter) 340 is made of glass and is disposed between the third lens 330 and the image plane 380 without affecting a focal length of the optical lens assembly. In this embodiment, an optical filter having a wavelength band of passable light in a range of 940 nm±30 nm is selected. It can be understood that the IR bandpass filter 340 may also be formed on the surface of the above-mentioned lens, and the IR bandpass filter 340 may also be made of other material.

Refer to Table 5 and Table 6 below.

TABLE 5

Third embodiment
f (focal length) = 1.21 mm, Fno (f-number) = 0.98, FOV (field of view 2ω) = 91.2 deg. (degrees)

| Surface # | | Radius of curvature (mm) | Central thickness/Gap (mm) | Material | Refractive index (nd) | Abbe number (vd) | Focal length (mm) |
|---|---|---|---|---|---|---|---|
| 0 | Object | Infinity | 800 | | | | |
| 1 | First lens | −0.788 (ASP) | 0.248 | Plastic | 1.64 | 22.47 | −59.33 |
| 2 | | −0.902 (ASP) | 0.253 | | | | |
| 3 | Stop | Infinity | −0.043 | | | | |
| 4 | Second lens | 3.644 (ASP) | 1.576 | Plastic | 1.67 | 19.24 | 1.63 |
| 5 | | −1.223 (ASP) | 0.176 | | | | |
| 6 | Third lens | 1.009 (ASP) | 0.382 | Plastic | 1.64 | 22.47 | 22.68 |
| 7 | | 0.930 (ASP) | 0.300 | | | | |
| 8 | IR bandpass filter | Infinity | 0.210 | Glass | 1.52 | 64.20 | |
| 9 | | Infinity | 0.253 | | | | |
| 10 | Image plane | Infinity | — | | | | |

Reference wavelength 940 nm

TABLE 6

| Aspheric coefficient | | | | | | |
|---|---|---|---|---|---|---|
| Surface | 1 | 2 | 4 | 5 | 6 | 7 |
| K: | −4.2858E+00 | −5.1736E+00 | 3.9165E+00 | −4.1531E−01 | −1.6841E+01 | −3.6194E−01 |
| A2: | 0.0000E+00 | 0.0000E+00 | 0.0000E+00 | 0.0000E+00 | 0.0000E+00 | 0.0000E+00 |
| A4: | 4.6769E−01 | 2.3960E−01 | 3.3971E−01 | −4.1272E−02 | 6.5187E−01 | −2.3201E−01 |
| A6: | 1.7975E−01 | 7.6178E+00 | 1.9720E+00 | −5.4701E−01 | −2.4944E+00 | −9.5043E−01 |
| A8: | −2.1171E+00 | −4.7582E+01 | 8.9129E+01 | 2.8648E+00 | 3.9204E+00 | 1.9239E+00 |
| A10: | 4.6315E+00 | 1.5227E+02 | 8.9129E+01 | −6.1500E+00 | −4.9051E+00 | −1.7797E+00 |
| A12: | −5.1227E+00 | −2.6889E+02 | −1.7930E+02 | 6.7829E+00 | 7.1966E+00 | 3.5947E−01 |

TABLE 6-continued

| | Aspheric coefficient | | | | | |
|---|---|---|---|---|---|---|
| Surface | 1 | 2 | 4 | 5 | 6 | 7 |
| A14: | 2.8771E+00 | 2.4864E+02 | 1.8356E+02 | −3.7949E+00 | −8.6139E+00 | 4.0042E−01 |
| A16: | −6.4897E−01 | −9.3590E+01 | −7.6470E+01 | 8.4811E−01 | 4.0263E+00 | −1.9571E−01 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the third embodiment, an aspheric curve equation is expressed as that in the first embodiment. In addition, definitions of parameters in the following tables are the same as those in the first embodiment, and are not repeated herein.

Referring to Table 5 and Table 6, the following data can be deduced:

| Third embodiment | | | |
|---|---|---|---|
| f1 | −59.33 | R5/R6 | 1.09 |
| f2 | 1.63 | CT3/R5 | 0.38 |
| f3 | 22.68 | R3/(R4*f2) | −1.83 |
| EPD*TL/T12 | 21.69 | (CT1 + CT2)/CT3 | 4.78 |
| FOV*Fno/(R5*TL) | 26.60 | T12/T23 | 1.08 |
| f/f2 | 0.74 | CT2*EPD/BFL | 2.55 |
| f1/f3 | −2.62 | BFL/TL | 0.23 |
| f2/CT2 | 1.03 | TL/IMH | 3.03 |
| f3/CT3 | 59.39 | HFOV*Fno/ (nd1 + nd2 + nd3) | 9.03 |
| R1/R2 | 0.87 | | |

Fourth Embodiment

Figure 4A:
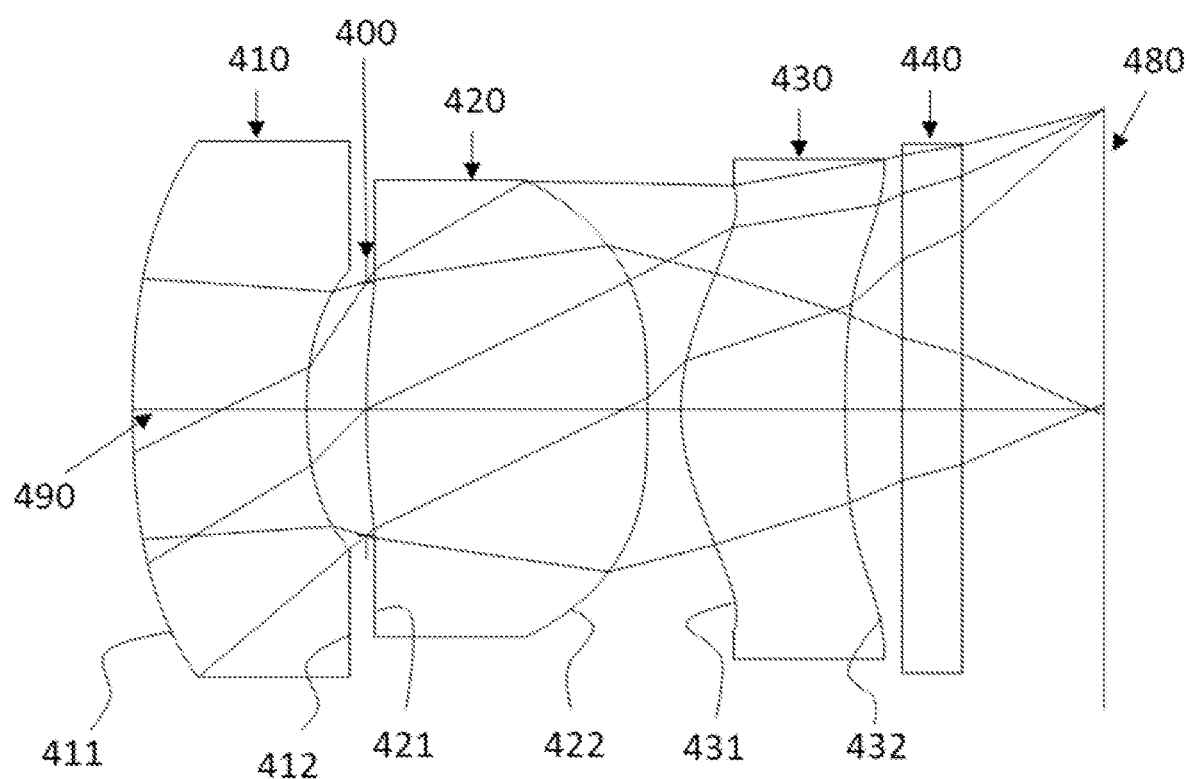
FIG. 4A is a schematic view of an optical lens assembly according to a fourth embodiment of the present disclosure.
Figure 4B:
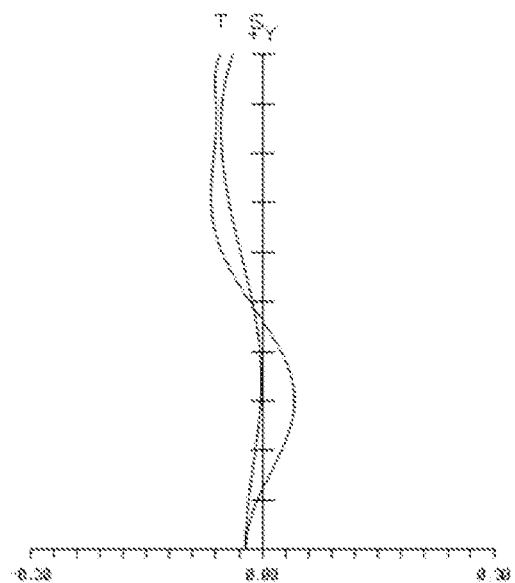
FIG. 4B sequentially shows a field curvature curve and a distortion curve of the optical lens assembly of the fourth embodiment.
Figure 4B:
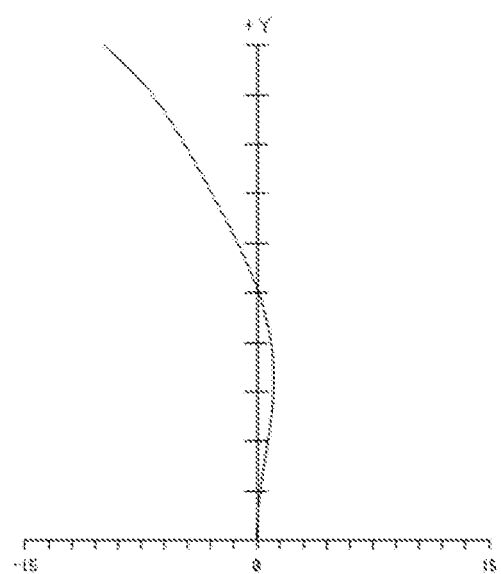

Referring to FIG. 4A and FIG. 4B, FIG. 4A is a schematic view of an optical lens assembly according to a fourth embodiment of the present disclosure, and FIG. 4B sequentially shows a field curvature curve and a distortion curve of the optical lens assembly according to the fourth embodiment. As can be seen from FIG. 4A, the optical lens assembly includes, in order from an object side to an image side: a first lens 410, a stop 400, a second lens 420, a third lens 430, an infrared bandpass filter 440 and an image plane 480. A total quantity of lenses with refractive power in the optical lens assembly is three, but this application is not limited thereto.

The first lens 410 with a positive refractive power includes an object-side surface 411 and an image-side surface 412, wherein the object-side surface 411 of the first lens 410 is concave near an optical axis 490, the image-side surface 412 of the first lens 410 is convex near the optical axis 490, and both the object-side surface 411 and the image-side surface 412 are aspheric.

The second lens 420 with a positive refractive power includes an object-side surface 421 and an image-side surface 422, wherein the object-side surface 421 of the second lens 420 is convex near the optical axis 490, the image-side surface 422 of the second lens 420 is convex near the optical axis 490, and both the object-side surface 421 and the image-side surface 422 are aspheric.

The third lens 430 with a positive refractive power includes an object-side surface 431 and an image-side surface 432, wherein the object-side surface 431 of the third lens 430 is convex near the optical axis 490, the image-side surface 432 of the third lens 430 is concave near the optical axis 490, and both the object-side surface 431 and the image-side surface 432 are aspheric.

The infrared bandpass filter (IR bandpass filter) 440 is made of glass and is disposed between the third lens 430 and the image plane 480 without affecting a focal length of the optical lens assembly. In this embodiment, an optical filter having a wavelength band of passable light in a range of 940 nm±30 nm is selected. It can be understood that the IR bandpass filter 440 may also be formed on the surface of the above-mentioned lens, and the IR bandpass filter 440 may also be made of other material.

Refer to Table 7 and Table 8 below.

TABLE 7

Fourth embodiment
f (focal length) = 1.21 mm, Fno (f-number) = 0.98, FOV (field of view 2ω) = 87.8 deg. (degrees)

| Surface # | | Radius of curvature (mm) | Central thickness/ Gap (mm) | Material | Refractive index (nd) | Abbe number (vd) | Focal length (mm) |
|---|---|---|---|---|---|---|---|
| 0 | Object | Infinity | 800 | | | | |
| 1 | First lens | −0.749 (ASP) | 0.252 | Plastic | 1.64 | 22.47 | −24.31 |
| 2 | | −0.890 (ASP) | 0.359 | | | | |
| 3 | Stop | Infinity | −0.137 | | | | |
| 4 | Second lens | 2.514 (ASP) | 1.620 | Plastic | 1.67 | 19.24 | 1.65 |
| 5 | | −1.382 (ASP) | 0.034 | | | | |
| 6 | Third lens | 1.116 (ASP) | 0.315 | Plastic | 1.64 | 22.47 | 9.19 |
| 7 | | 1.237 (ASP) | 0.366 | | | | |
| 8 | IR bandpass filter | Infinity | 0.210 | Glass | 1.52 | 64.20 | |
| 9 | | Infinity | 0.300 | | | | |
| 10 | Image plane | Infinity | — | | | | |

Reference wavelength 940 nm

TABLE 8

Aspheric coefficient

| Surface | 1 | 2 | 4 | 5 | 6 | 7 |
|---|---|---|---|---|---|---|
| K: | −4.4350E+00 | −4.9632E+00 | 4.8028E+00 | −3.9759E−01 | −1.4179E+01 | 2.4956E−01 |
| A2: | 0.0000E+00 | 0.0000E+00 | 0.0000E+00 | 0.0000E+00 | 0.0000E+00 | 0.0000E+00 |
| A4: | 5.6891E−01 | 8.8331E−01 | 4.6958E−01 | −7.9808E−02 | 5.8215E−01 | 1.9228E−01 |
| A6: | −5.9888E−01 | −4.6383E−01 | −9.8439E−01 | 5.0375E−02 | −1.6081E+00 | −1.5816E+00 |
| A8: | 4.9201E−01 | −3.9631E−01 | 2.6298E+00 | 4.3085E−02 | 8.1621E−01 | 2.3761E+00 |
| A10: | −3.0509E−01 | 1.6702E+00 | 2.6298E+00 | −7.9408E−02 | 8.5874E−01 | −2.2869E+00 |
| A12: | 1.4730E−01 | −1.6964E+00 | −1.1576E+00 | 2.1878E−02 | −1.0176E+00 | 8.1667E−01 |
| A14: | −5.7423E−02 | 1.0889E+00 | −4.4583E+00 | 1.0021E−02 | −1.2863E+00 | 2.6861E−01 |
| A16: | 1.1154E−02 | −5.2784E−01 | 3.9644E+00 | −7.4394E−03 | 9.9248E−01 | −2.0496E−01 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the fourth embodiment, an aspheric curve equation is expressed as that in the first embodiment. In addition, definitions of parameters in the following tables are the same as those in the first embodiment, and are not repeated herein.

Referring to Table 7 and Table 8, the following data can be deduced:

| Fourth embodiment | | | |
|---|---|---|---|
| f1 | −24.31 | R5/R6 | 0.90 |
| f2 | 1.65 | CT3/R5 | 0.28 |
| f3 | 9.19 | R3/(R4*f2) | −1.10 |
| EPD*TL/T12 | 18.45 | (CT1 + CT2)/CT3 | 5.95 |
| FOV*Fno/(R5*TL) | 23.32 | T12/T23 | 6.54 |
| f/f2 | 0.73 | CT2*EPD/BFL | 2.28 |
| f1/f3 | −2.65 | BFL/TL | 0.26 |
| f2/CT2 | 1.02 | TL/IMH | 3.13 |
| f3/CT3 | 29.19 | HFOV*Fno/(nd1 + nd2 + nd3) | 8.71 |
| R1/R2 | 0.84 | | |

Fifth Embodiment

Figure 5A:
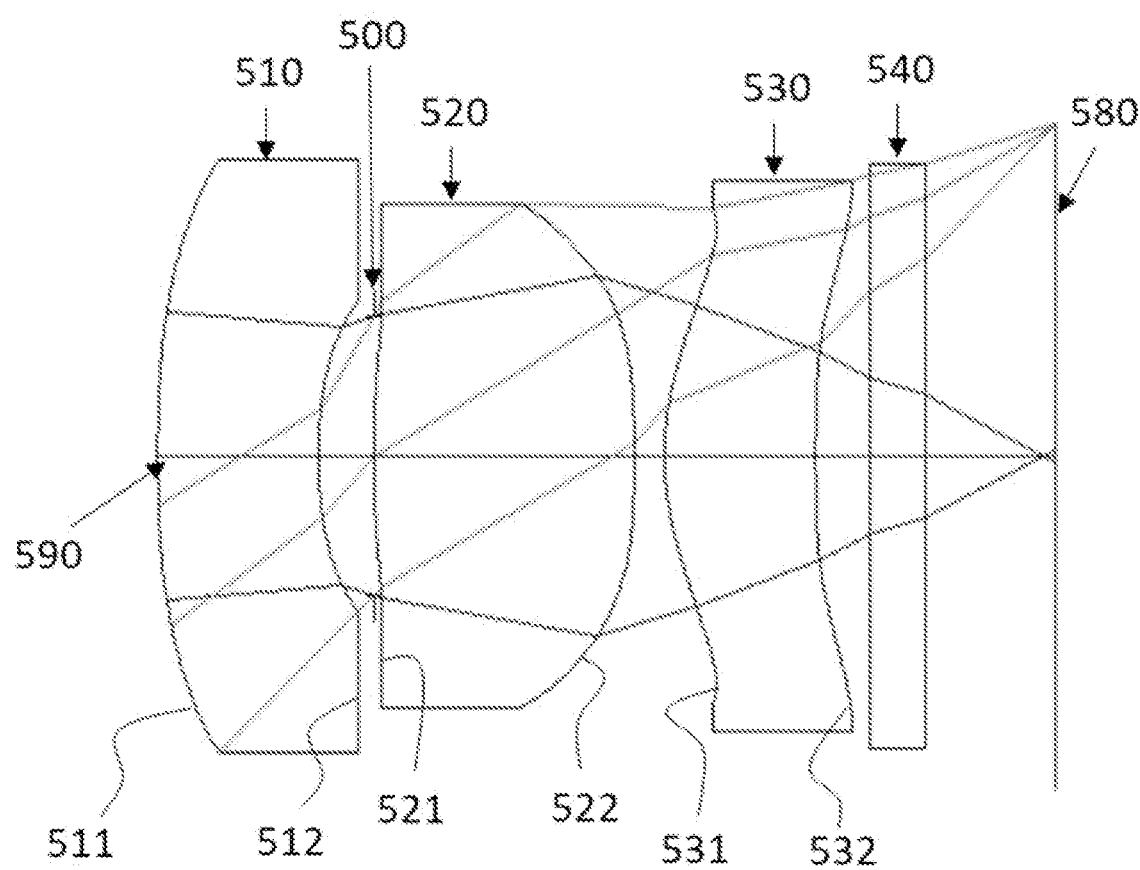
FIG. 5A is a schematic view of an optical lens assembly according to a fifth embodiment of the present disclosure.
Figure 5B:
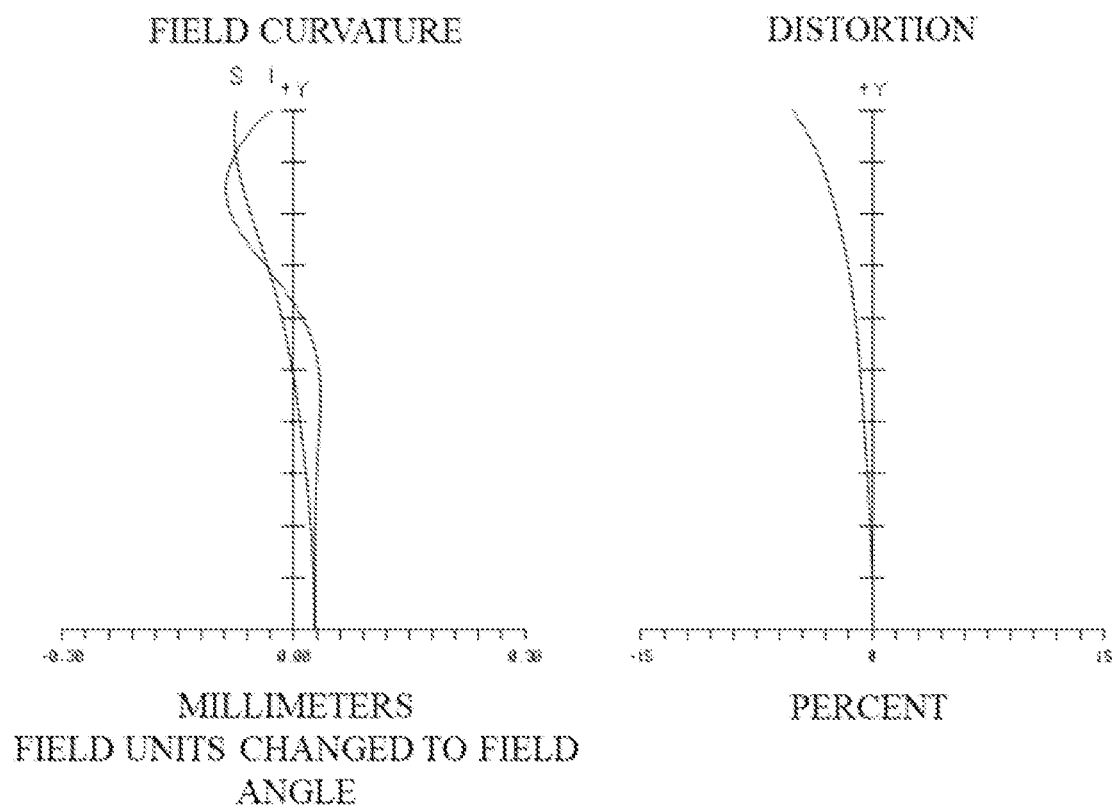
FIG. 5B sequentially shows a field curvature curve and a distortion curve of the optical lens assembly of the fifth embodiment.

Referring to FIG. 5A and FIG. 5B, FIG. 5A is a schematic view of an optical lens assembly according to a fifth embodiment of the present disclosure, and FIG. 5B sequentially shows a field curvature curve and a distortion curve of the optical lens assembly according to the fifth embodiment. As can be seen from FIG. 5A, the optical lens assembly includes, in order from an object side to an image side: a first lens 510, a stop 500, a second lens 520, a third lens 530, an infrared bandpass filter 540 and an image plane 580. A total quantity of lenses with refractive power in the optical lens assembly is three, but this application is not limited thereto.

The first lens 510 with a positive refractive power includes an object-side surface 511 and an image-side surface 512, wherein the object-side surface 511 of the first lens 510 is convex near an optical axis 590, the image-side surface 512 of the first lens 510 is concave near the optical axis 590, and both the object-side surface 511 and the image-side surface 512 are aspheric.

The second lens 520 with a positive refractive power includes an object-side surface 521 and an image-side surface 522, wherein the object-side surface 521 of the second lens 520 is convex near the optical axis 590, the image-side surface 522 of the second lens 520 is convex near the optical axis 590, and both the object-side surface 521 and the image-side surface 522 are aspheric.

The third lens 530 with a positive refractive power includes an object-side surface 531 and an image-side surface 532, wherein the object-side surface 531 of the third lens 530 is convex near the optical axis 590, the image-side surface 532 of the third lens 530 is concave near the optical axis 590, and both the object-side surface 531 and the image-side surface 532 are aspheric.

The infrared bandpass filter (IR bandpass filter) 540 is made of glass and is disposed between the third lens 530 and the image plane 580 without affecting a focal length of the optical lens assembly. In this embodiment, an optical filter having a wavelength band of passable light in a range of 940 nm±30 nm is selected. It can be understood that the IR bandpass filter 540 may also be formed on the surface of the above-mentioned lens, and the IR bandpass filter 540 may also be made of other material.

Refer to Table 9 and Table 10 below.

TABLE 9

Fifth embodiment
f (focal length) = 1.21 mm, Fno (f-number) = 1.30, FOV (field of view 2ω) = 86.0 deg. (degrees)

| Surface # | | Radius of curvature (mm) | Central thickness/ Gap (mm) | Material | Refractive index (nd) | Abbe number (vd) | Focal length (mm) |
|---|---|---|---|---|---|---|---|
| 0 | Object | Infinity | 800 | | | | |
| 1 | First lens | 3.610 (ASP) | 0.612 | Plastic | 1.64 | 22.47 | −3.31 |
| 2 | | 1.225 (ASP) | 0.210 | | | | |
| 3 | Stop | Infinity | 0.000 | | | | |
| 4 | Second lens | 2.640 (ASP) | 0.992 | Plastic | 1.64 | 22.47 | 3.16 |
| 5 | | −6.525 (ASP) | 0.115 | | | | |
| 6 | Third lens | 0.747 (ASP) | 0.575 | Plastic | 1.64 | 22.47 | 1.30 |
| 7 | | 6.721 (ASP) | 0.205 | | | | |

TABLE 9-continued

Fifth embodiment
f (focal length) = 1.21 mm, Fno (f-number) = 1.30, FOV (field of view 2ω) = 86.0 deg. (degrees)

| Surface # | | Radius of curvature (mm) | Central thickness/ Gap (mm) | Material | Refractive index (nd) | Abbe number (vd) | Focal length (mm) |
|---|---|---|---|---|---|---|---|
| 8 | IR bandpass filter | Infinity | 0.210 | Glass | 1.52 | 64.20 | |
| 9 | | Infinity | 0.500 | | | | |
| 10 | Image plane | Infinity | — | | | | |

Reference wavelength 940 nm

TABLE 8

| | Aspheric coefficient | | | | | |
|---|---|---|---|---|---|---|
| Surface | 1 | 2 | 4 | 5 | 6 | 7 |
| K: | 9.8426E+00 | 3.7738E+00 | 1.9725E+01 | −1.3524E+02 | −3.4054E+00 | 3.8645E+01 |
| A2: | 0.0000E+00 | 0.0000E+00 | 0.0000E+00 | 0.0000E+00 | 0.0000E+00 | 0.0000E+00 |
| A4: | 1.2624E−01 | 8.9558E−02 | −1.5647E−01 | −1.5425E+00 | −1.7627E−01 | 7.5870E−01 |
| A6: | −6.9536E−02 | 1.8898E+00 | −1.5674E+00 | 1.9951E+00 | 3.9366E−01 | −1.0326E+00 |
| A8: | 2.3077E−02 | −1.3118E+00 | 2.2106E+00 | −1.2187E+00 | −5.4897E−01 | 1.6966E−02 |
| A10: | 5.7999E−03 | −3.8656E+01 | 1.7877E+01 | −1.9563E+00 | −8.4355E−01 | 3.1303E−01 |
| A12: | 2.9297E−03 | 9.8099E+01 | −3.7962E+01 | 1.5819E+00 | 3.8311E−01 | 7.1925E−02 |
| A14: | −1.8256E−03 | 3.2260E+02 | −6.3049E+02 | 3.6205E+00 | 1.5235E+00 | −9.6468E−02 |
| A16: | −1.0069E−02 | −1.4547E+03 | 1.6716E+03 | −4.3579E+00 | −1.8719E+00 | −2.9148E−02 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the fifth embodiment, an aspheric curve equation is expressed as that in the first embodiment. In addition, definitions of parameters in the following tables are the same as those in the first embodiment, and are not repeated herein.

Referring to Table 9 and Table 10, the following data can be deduced:

| Fifth embodiment | | | |
|---|---|---|---|
| f1 | −3.31 | R5/R6 | 0.11 |
| f2 | 3.16 | CT3/R5 | 0.77 |
| f3 | 1.30 | R3/(R4*f2) | −0.13 |
| EPD*TL/T12 | 15.04 | (CT1 + CT2)/CT3 | 2.79 |
| FOV*Fno/(R5*TL) | 43.80 | T12/T23 | 1.83 |
| f/f2 | 0.38 | CT2*EPD/BFL | 1.00 |
| f1/f3 | −2.54 | BFL/TL | 0.27 |
| f2/CT2 | 3.18 | TL/IMH | 3.23 |
| f3/CT3 | 2.27 | HFOV*Fno/ (nd1 + nd2 + nd3) | 11.35 |
| R1/R2 | 2.95 | | |

Sixth Embodiment

Figure 6A:
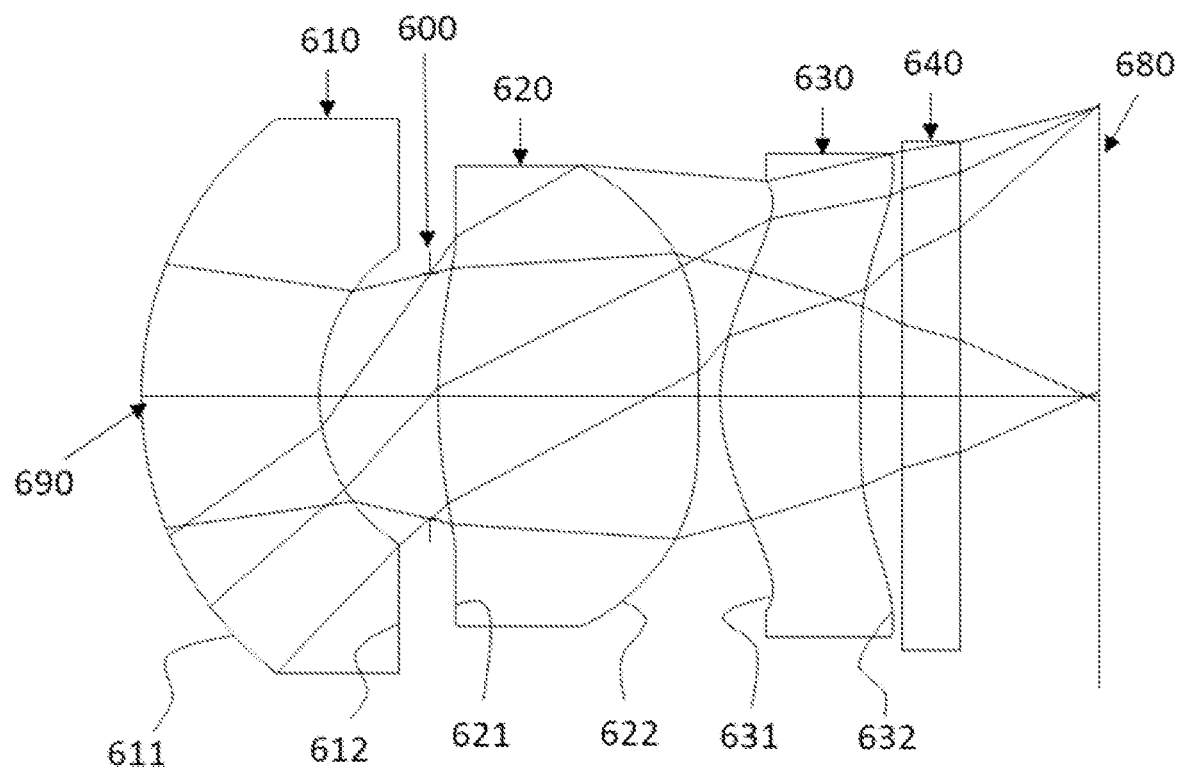
FIG. 6A is a schematic view of an optical lens assembly according to a sixth embodiment of the present disclosure.
Figure 6B:
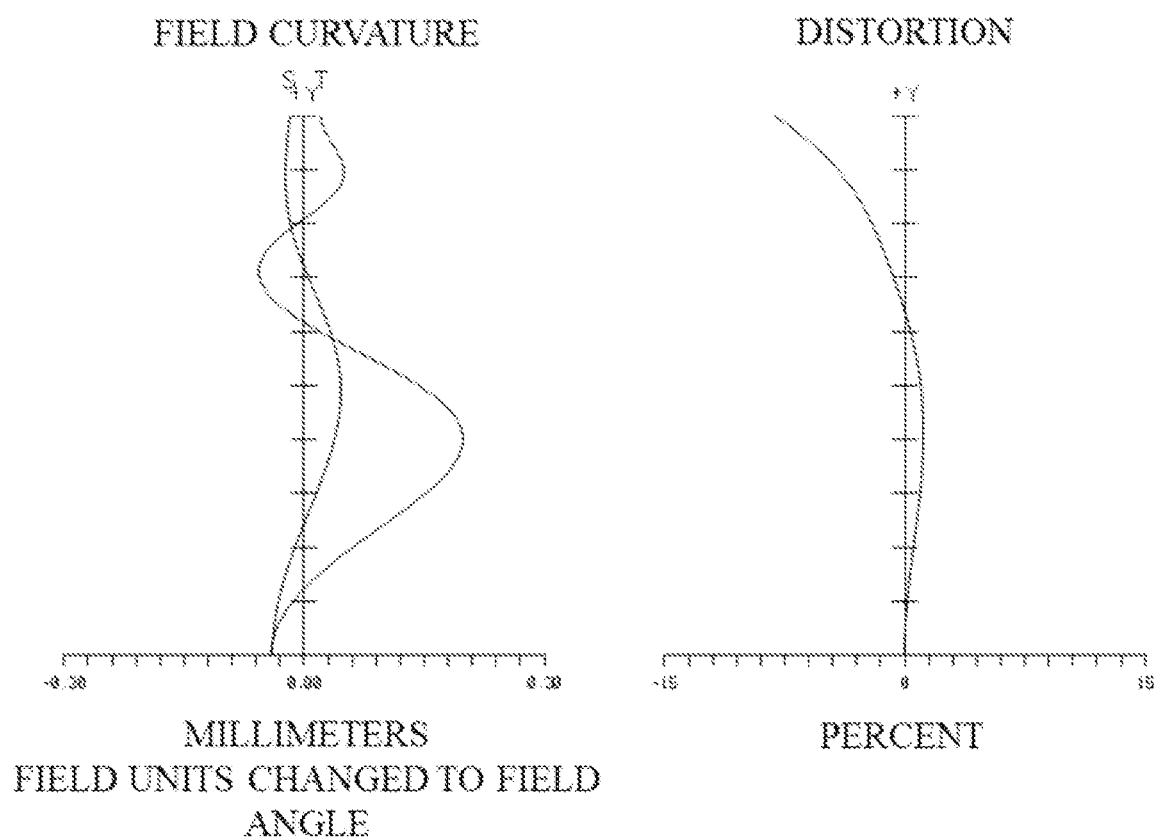
FIG. 6B sequentially shows a field curvature curve and a distortion curve of the optical lens assembly of the sixth embodiment.

Referring to FIG. 6A and FIG. 6B, FIG. 6A is a schematic view of an optical lens assembly according to a sixth embodiment of the present disclosure, and FIG. 6B sequentially shows a field curvature curve and a distortion curve of the optical lens assembly according to the sixth embodiment. As can be seen from FIG. 6A, the optical lens assembly includes, in order from an object side to an image side: a first lens 610, a stop 600, a second lens 620, a third lens 630, an infrared bandpass filter 640 and an image plane 680. A total quantity of lenses with refractive power in the optical lens assembly is three, but this application is not limited thereto.

The first lens 610 with a positive refractive power includes an object-side surface 611 and an image-side surface 612, wherein the object-side surface 611 of the first lens 610 is convex near an optical axis 690, the image-side surface 612 of the first lens 610 is concave near the optical axis 690, and both the object-side surface 611 and the image-side surface 612 are aspheric.

The second lens 620 with a positive refractive power includes an object-side surface 621 and an image-side surface 622, wherein the object-side surface 621 of the second lens 620 is convex near the optical axis 690, the image-side surface 622 of the second lens 620 is convex near the optical axis 690, and both the object-side surface 621 and the image-side surface 622 are aspheric.

The third lens 630 with a positive refractive power includes an object-side surface 631 and an image-side surface 632, wherein the object-side surface 631 of the third lens 630 is convex near the optical axis 690, the image-side surface 632 of the third lens 630 is convex near the optical axis 690, and both the object-side surface 631 and the image-side surface 632 are aspheric.

The infrared bandpass filter (IR bandpass filter) 640 is made of glass and is disposed between the third lens 630 and the image plane 680 without affecting a focal length of the optical lens assembly. In this embodiment, an optical filter having a wavelength band of passable light in a range of 940 nm±30 nm is selected. It can be understood that the IR bandpass filter 640 may also be formed on the surface of the above-mentioned lens, and the IR bandpass filter 640 may also be made of other material.

Refer to Table 11 and Table 12 below.

TABLE 11

Sixth embodiment
f (focal length) = 1.17 mm, Fno (f-number) = 1.22, FOV (field of view 2ω) = 88.2 deg. (degrees)

| Surface # | | Radius of curvature (mm) | Central thickness/ Gap (mm) | Material | Refractive index (nd) | Abbe number (vd) | Focal length (mm) |
|---|---|---|---|---|---|---|---|
| 0 | Object | Infinity | 800 | | | | |
| 1 | First lens | 1.296 (ASP) | 0.641 | Plastic | 1.64 | 22.47 | −3.82 |
| 2 | | 0.679 (ASP) | 0.404 | | | | |
| 3 | Stop | Infinity | 0.027 | | | | |
| 4 | Second lens | 1.899 (ASP) | 0.943 | Plastic | 1.64 | 22.47 | 2.97 |
| 5 | | −49.734 (ASP) | 0.078 | | | | |
| 6 | Third lens | 0.728 (ASP) | 0.509 | Plastic | 1.64 | 22.47 | 1.12 |
| 7 | | −11.045 (ASP) | 0.154 | | | | |
| 8 | IR bandpass filter | Infinity | 0.210 | Glass | 1.52 | 64.20 | |
| 9 | | Infinity | 0.500 | | | | |
| 10 | Image plane | Infinity | — | | | | |

Reference wavelength 940 nm

TABLE 12

Aspheric coefficient

| Surface | 1 | 2 | 4 | 5 | 6 | 7 |
|---|---|---|---|---|---|---|
| K: | 3.9550E−01 | 2.1811E−03 | 4.2931E+00 | −1.0010E+02 | −5.1237E+00 | 1.0251E+02 |
| A2: | 0.0000E+00 | 0.0000E+00 | 0.0000E+00 | 0.0000E+00 | 0.0000E+00 | 0.0000E+00 |
| A4: | −1.4688E−01 | 1.7777E−01 | 8.1570E−02 | −1.5134E+00 | 9.5050E−02 | 1.3896E+00 |
| A6: | 3.3225E−01 | −9.7707E−01 | −2.1855E+00 | 1.8165E+00 | 3.2006E−01 | −2.3517E+00 |
| A8: | −1.6649E−01 | 9.1074E+00 | −4.8901E−01 | −8.4121E−01 | −1.5075E+00 | 1.0481E+00 |
| A10: | −3.2580E−01 | −3.3789E+01 | 2.6762E+01 | −1.3522E+00 | −1.3102E+00 | 4.8025E−01 |
| A12: | 1.4771E−02 | 6.2389E+01 | 2.9711E+01 | 1.0994E+00 | 3.0680E+00 | −3.8874E−01 |
| A14: | 5.8096E−01 | 2.1085E+02 | −4.4591E+02 | 2.0880E+00 | 3.8568E+00 | −1.6128E−01 |
| A16: | −3.6285E−01 | −7.4789E+02 | 6.2723E+02 | −2.8158E+00 | −7.5175E+00 | 1.0870E−01 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the sixth embodiment, an aspheric curve equation is expressed as that in the first embodiment. In addition, definitions of parameters in the following tables are the same as those in the first embodiment, and are not repeated herein.

Referring to Table 11 and Table 12, the following data can be deduced:

| Sixth embodiment | | | |
|---|---|---|---|
| f1 | −3.82 | R5/R6 | −0.07 |
| f2 | 2.97 | CT3/R5 | 0.70 |
| f3 | 1.12 | R3/(R4*f2) | −0.01 |
| EPD*TL/T12 | 7.74 | (CT1 + CT2)/CT3 | 3.11 |
| FOV*Fno/(R5*TL) | 42.66 | T12/T23 | 5.50 |
| f/f2 | 0.40 | CT2*EPD/BFL | 1.05 |
| f1/f3 | −3.42 | BFL/TL | 0.25 |
| f2/CT2 | 3.14 | TL/IMH | 3.27 |
| f3/CT3 | 2.19 | HFOV*Fno/ (nd1 + nd2 + nd3) | 10.92 |
| R1/R2 | 1.91 | | |

In the foregoing embodiments, those with ordinary knowledge in the art should understand that, in the optical lens assembly provided in the present disclosure, the lens may be made of glass or plastic. The lens made of glass can increase the degree of freedom of the configuration of the refractive power of the optical lens assembly. The lens made of glass may be made by using related technologies such as grinding, molding, or the like. The lens made of plastic can reduce the production costs.

In the optical lens assembly provided in the present disclosure, for the lens with refractive power, if the surface of the lens is convex and a position of the convex surface is not defined, it indicates that the surface of the lens is convex near the optical axis. If the surface of the lens is concave and a position of the concave surface is not defined, it indicates that the surface of the lens is concave near the optical axis.

The optical lens assembly provided in the present disclosure can be further applied to a miniaturized optical lens system with an ultra-large optical aperture and a wide viewing angle, and can be widely applied to electronic imaging systems such as a mobile phone, a notebook computer, a digital tablet, a mobile device, a digital camera, a car camera, or an aerial camera.

What is claimed is:

1. An optical lens assembly, in order from an object side to an image side, comprising:

a first lens with a refractive power;

a stop;

a second lens with a positive refractive power, comprising an object-side surface and an image-side surface, the object-side surface of the second lens being convex near an optical axis, and the image-side surface of the second lens being convex near the optical axis;

a third lens with a positive refractive power, comprising an object-side surface and an image-side surface, the object-side surface of the third lens being convex near the optical axis; and an infrared bandpass filter;

wherein a maximum field of view of the optical lens assembly is FOV, an f-number of the optical lens assembly is Fno, a radius of curvature of the object-side surface of the third lens is R5, a distance from an object-side surface of the first lens to an image plane along the optical axis is TL, an entrance pupil diameter of the optical lens assembly is EPD, a distance from the image-side surface of the first lens to the object-side surface of the second lens along the optical axis is T12, and the following conditions are satisfied: 19.82<FOV*Fno/(R5*TL)<50.37, and 6.58<EPD*TL/T12<24.94.

2. The optical lens assembly according to claim 1, wherein a focal length of the optical lens assembly is f, a focal length of the second lens is f2, and the following condition is satisfied: 0.33<f/f2<0.86.

3. The optical lens assembly according to claim 1, wherein a focal length of the first lens is f1, a focal length of the third lens is f3, and the following condition is satisfied: −3.93<f1/f3<1.44.

4. The optical lens assembly according to claim 1, wherein a focal length of the second lens is f2, a central thickness of the second lens along the optical axis is CT2, and the following condition is satisfied: 0.87<f2/CT2<3.66.

5. The optical lens assembly according to claim 1, wherein a focal length of the third lens is f3, a central thickness of the third lens along the optical axis is CT3, and the following condition is satisfied: 1.86<f3/CT3<68.30.

6. The optical lens assembly according to claim 1, wherein a radius of curvature of the object-side surface of the first lens is R1, a radius of curvature of an image-side surface of the first lens is R2, and the following condition is satisfied: 0.72<R1/R2<3.39.

7. The optical lens assembly according to claim 1, wherein the radius of curvature of the object-side surface of the third lens is R5, a radius of curvature of an image-side surface of the third lens is R6, and the following condition is satisfied: −0.08<R5/R6<1.25.

8. The optical lens assembly according to claim 1, wherein a central thickness of the third lens along the optical axis is CT3, the radius of curvature of the object-side surface of the third lens is R5, and the following condition is satisfied: 0.24<CT3/R5<0.89.

9. The optical lens assembly according to claim 1, wherein a radius of curvature of the object-side surface of the second lens is R3, a radius of curvature of the image-side surface of the second lens is R4, a focal length of the second lens is f2, and the following condition is satisfied: −69.59<R3/(R4*f2)<−0.01.

10. The optical lens assembly according to claim 1, wherein a central thickness of the first lens along the optical axis is CT1, a central thickness of the second lens along the optical axis is CT2, a central thickness of the third lens along the optical axis is CT3, and the following condition is satisfied: 2.37<(CT1+CT2)/CT3<7.61.

11. The optical lens assembly according to claim 1, wherein the distance from the image-side surface of the first lens to the object-side surface of the second lens along the optical axis is T12, a distance from the image-side surface of the second lens to the object-side surface of the third lens along the optical axis is T23, and the following condition is satisfied: 0.92<T12/T23<7.52.

12. The optical lens assembly according to claim 1, wherein a central thickness of the second lens along the optical axis is CT2, the entrance pupil diameter of the optical lens assembly is EPD, a distance from an image-side surface of the third lens to the image plane along the optical axis is BFL, and the following condition is satisfied: 0.85<CT2*EPD/BFL<2.93.

13. The optical lens assembly according to claim 1, wherein a distance from an image-side surface of the third lens to the image plane along the optical axis is BFL, the distance from the object-side surface of the first lens to the image plane along the optical axis is TL, and the following condition is satisfied: 0.19<BFL/TL<0.34.

14. The optical lens assembly according to claim 1, wherein the distance from an object-side surface of the first lens to the image plane along the optical axis is TL, a maximum image height of the optical lens assembly is IMH, and the following condition is satisfied: 2.36<TL/IMH<3.76.

15. The optical lens assembly according to claim 1, wherein a half of the maximum field of view of the optical lens assembly is HFOV, the f-number of the optical lens assembly is Fno, a refractive index of the first lens is nd1, a refractive index of the second lens is nd2, a refractive index of the third lens is nd3, and the following condition is satisfied: 7.40<HFOV*Fno/(nd1+nd2+nd3)<13.05.

* * * * *